United States Patent
Guilemond et al.

(10) Patent No.: US 11,654,959 B2
(45) Date of Patent: May 23, 2023

(54) METHOD FOR ESTIMATING A VALUE FOR FRICTION

(71) Applicant: JTEKT EUROPE, Irigny (FR)

(72) Inventors: Alain Guilemond, Marennes (FR); Nicolas Baudouin, Lyons (FR)

(73) Assignee: JTEKT EUROPE, Irigny (FR)

( * ) Notice: Subject to any disclaimer, the term of this patent is extended or adjusted under 35 U.S.C. 154(b) by 246 days.

(21) Appl. No.: 16/647,415

(22) PCT Filed: Sep. 7, 2018

(86) PCT No.: PCT/FR2018/052190
§ 371 (c)(1),
(2) Date: Mar. 13, 2020

(87) PCT Pub. No.: WO2019/053356
PCT Pub. Date: Mar. 21, 2019

(65) Prior Publication Data
US 2020/0255059 A1    Aug. 13, 2020

(30) Foreign Application Priority Data
Sep. 13, 2017   (FR) ..................................... 17/58486

(51) Int. Cl.
*B62D 5/04* (2006.01)
(52) U.S. Cl.
CPC ......... *B62D 5/0481* (2013.01); *B62D 5/0421* (2013.01)
(58) Field of Classification Search
CPC .............................. B62D 5/0481; B62D 5/0421
See application file for complete search history.

(56) References Cited

U.S. PATENT DOCUMENTS

| 2011/0190984 A1 | 8/2011 | Reeve |
| 2016/0280255 A1 | 9/2016 | Wilhelm et al. |
| 2017/0015350 A1 | 1/2017 | Bourdrez et al. |
| 2017/0023445 A1 | 1/2017 | Bourdrez et al. |

FOREIGN PATENT DOCUMENTS

| CN | 106794873 A | * | 5/2017 | ............ B60W 50/04 |
| EP | 3 120 124 B1 | | 4/2018 | |
| FR | 2960505 A1 | * | 12/2011 | ........... B62D 5/0481 |
| KR | 20020027884 A | * | 4/2002 | |
| WO | WO-2015140447 A1 | * | 9/2015 | ........... B62D 5/0463 |

OTHER PUBLICATIONS

Nov. 22, 2018 International Search Report issued in International Patent Application No. PCT/FR2018/052190.

* cited by examiner

*Primary Examiner* — Jacob D Knutson
(74) *Attorney, Agent, or Firm* — Oliff PLC

(57) ABSTRACT

A method for estimating a value for friction exerted on a power steering system of a vehicle, during turning resulting in the crossing of a straight line angle, the turning being achieved at a substantially uniform speed included within a predefined range, and an angle of a steering wheel included within a predefined range, including: a step (1) of acquiring a plurality of vehicle-related data items, including at least one value of a force of a power steering motor on a rack and pinion, and a value of a force of the steering wheel on the rack and pinion; a step (4) of estimating the value for friction by averaging the sum of the forces of the steering wheel and the forces of the power steering motor on the rack and pinion.

12 Claims, 1 Drawing Sheet

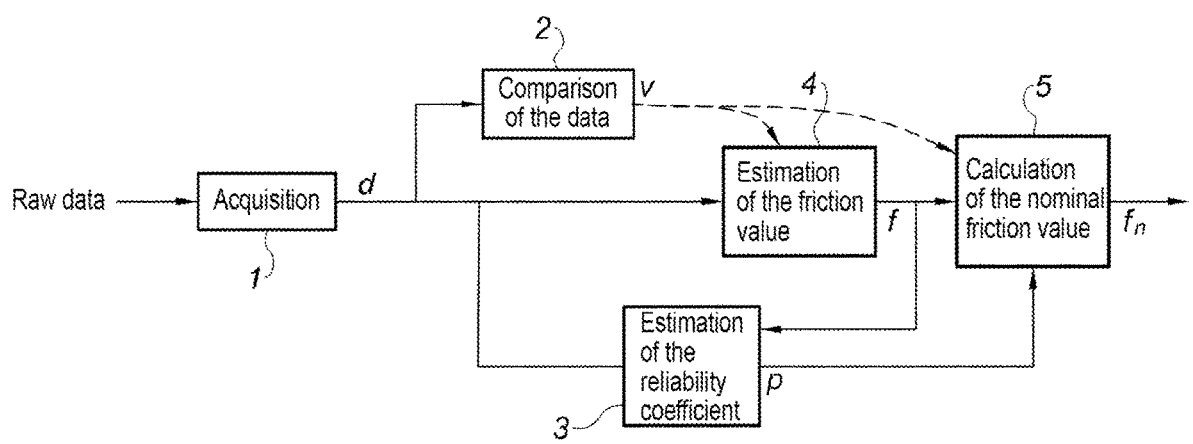

METHOD FOR ESTIMATING A VALUE FOR FRICTION

The invention relates to a power steering system of a vehicle and more particularly to the calculation of the friction being exerted on a power steering rack.

A steering system of a vehicle allows a driver to determine a vehicle trajectory by exerting efforts on a steering wheel.

Generally, a steering system comprises several elements including a steering wheel connected to a steering column, a rack, and two wheels each connected to a link. The rack is the part allowing connecting the steering wheel, via the steering column, to the wheels, via the links; that is to say that the rack transforms the efforts exerted by the driver on the steering wheel into a rotation of the vehicle wheels.

An electric power steering system of a vehicle uses an assist motor, controlled by a steering computer, in order to reduce the efforts to be made by the driver to turn the vehicle wheels. Depending on the efforts exerted on the steering wheel, the assist motor controls the rack so as to turn the wheels.

Elements constituting the electric power steering system are mechanical elements adjusted relative to each other so as to be in contact. Tolerances during the production of the vehicles implies that the adjustment of the mechanical elements is not exactly similar between two vehicles of the same series, that is to say between two vehicles having similar characteristics. Thus, when two vehicles of the same series are placed under the same conditions, a variation in the adjustment of the mechanical elements leads to a variation in the friction values linked to the contact of the mechanical elements with each other.

The friction being exerted on the power steering system also depends on, for example, a steering wheel angle, a vehicle speed, a temperature of the power steering system.

The differences in the friction values being exerted on the power steering system between two vehicles of the same series can lead to differences in driving feeling by the driver between the two vehicles.

Car manufacturers want the difference in feeling between two vehicles of the same series placed under the same conditions to be as low as possible. To ensure that the feeling is close between two vehicles of the same series placed under the same conditions, the manufacturers have determined that the value of some criteria, such as, for example, the steering wheel effort or the hysteresis at the steering wheel, should be within a predefined range.

To ensure that these criteria are within the predefined permissible range, it is necessary to estimate the value of the friction being exerted on the power steering system of the vehicle.

Subsequently, the Rack Force estimation (RFe) is defined as the sum of the efforts exerted by the steering wheel and by the assist motor on the rack.

There is a known solution, described in the patent EP 3120124 on behalf of the applicant, allowing estimating the value of the friction being exerted on the electric power steering system of a vehicle by the construction of an empirical friction model from a point cloud, each point associating a measured value of the RFe with a measured friction value. The friction model is a regression of the point cloud according to a correlation law, which has been previously defined in the computer of the power steering system.

This solution has the advantage of providing an estimate of the friction value over a wide range of the RFe. However, this estimation range is not required to meet the criteria of the car manufacturers.

Furthermore, a drawback of the described solution is that the friction model is dependent on the predefined correlation law. This can lead to unacceptable errors, greater than +/−30N, in the estimation of the friction value.

The object of the invention is to overcome all or part of the aforementioned drawbacks by proposing, a method for estimating a value of the friction being exerted on a power steering system of a vehicle, during a turning resulting in a crossing of a straight line angle, said turning being carried out with a substantially uniform speed comprised in a predefined interval, and an angle of a steering wheel comprised in a predefined interval, including:
- a step of acquiring a plurality of vehicle data, including at least one value of an effort of an assist motor on a rack, and one value of a steering wheel effort on said rack,
- a step of estimating the friction value by averaging the sum of the steering wheel efforts and the assist motor efforts on the rack.

A straight line angle is a steering wheel angle for which the vehicle follows a rectilinear trajectory.

The term «turning resulting in a crossing of a straight line angle» means a turning, that is to say a rotation of the steering wheel, allowing varying the value of the steering wheel angle on either side of the straight line angle.

The term «substantially uniform turning speed» means a substantially constant rotation speed of the steering wheel, therefore having an acceleration equal to zero or less than a predefined value.

Thus, when the turning of the vehicle results in the crossing of the straight line angle, that said turning is carried out with a substantially uniform speed comprised in a predefined interval, and that the steering wheel angle is comprised in a predefined interval, a balance of the efforts being exerted on the rack allows estimating that the RFe is equal to the friction value.

The step of acquiring the vehicle data allows making available, to the step of estimating the friction value, the data required to carry out said estimation step.

As multiple parameters can occasionally influence the value of the RFe, the step of estimating the friction value averages the RFe when the conditions are validated. Thus, the calculation of the average allows obtaining a value closer to reality than a point value.

According to one feature of the invention, the turning speed is comprised between 5 and 20°/s.

According to one feature of the invention, the steering wheel angle is comprised between +/−2° relative to the angle for which the vehicle follows a substantially rectilinear trajectory.

According to one feature of the invention, a value of an angular spacing relative to the last turning reversal is 5°.

According to one feature of the invention, the estimation method comprises a step of calculating the nominal friction value by recurrence depending on the friction value.

The nominal friction value is a function of the previously calculated nominal friction value. Thus, the calculation of the nominal friction value allows filtering variations of the calculated friction values. These variations can be very significant. Indeed, although the conditions are fulfilled, many other uncontrollable external factors can affect the data such as for example a particular coating, a slope, or a deformed pavement.

The nominal friction value is more realistic than the friction value.

According to one feature of the invention, the estimation method comprises, after the step of acquiring a plurality of vehicle data, a step of comparing the data comparing at least one temperature of a computer, to a range of predefined values.

For example, the range of predefined values is comprised between 0 and 60° C.

According to one feature of the invention, the comparison step emits a validation signal when the data are in the range of predefined values and/or emits an invalidation signal when at least one datum is not in the range of predefined values.

According to one feature of the invention, the step of estimating the friction value is performed when the step of comparing the data emits the validation signal and/or when the step of comparing the data does not emit the invalidation signal.

Thus, the estimated friction value is more accurate since the conditions for carrying out the estimation of the friction value are more numerous.

According to one feature of the invention, the estimation method comprises a step of estimating a reliability coefficient of the vehicle data and the estimated friction value.

The reliability coefficient of the vehicle data and the estimated friction value is a value estimated from predefined maps and charts for each data.

According to one feature of the invention, the calculation of the nominal friction value is weighted by at least the reliability coefficient of the vehicle data and the estimated friction value.

Thus, there is a weighting of the nominal friction value depending on the reliability coefficient. The lower the reliability coefficient, the more the calculation of the nominal friction value allows filtering the variations of the calculated friction values.

The weighting of the nominal friction by the reliability coefficient allows giving more importance to the most reliable friction values.

According to one feature of the invention, the calculation of the nominal friction value is weighted by an averaging coefficient.

The averaging coefficient has a filtering effect on the nominal friction values. This coefficient is scalable during a period of vehicle operation. This allows changing a compromise between speed and stability of the calculation of the nominal friction value depending on the period of vehicle operation.

According to one feature of the invention, the step of acquiring a plurality of vehicle data comprises a phase of processing the vehicle data.

Thus, the processing phase ensures an extraction of the vehicle data from the received raw data. The processing phase in particular removes the dynamic components from the received raw data, by applying a low-pass filter.

According to one feature of the invention, the phase of calculating the nominal friction value is performed when the step of comparing the data does not emit the validation signal, and/or when the step of comparing the data emits the invalidation signal.

Thus, the estimation of the nominal friction value is carried out when the conditions are no longer validated.

The invention will be better understood, thanks to the description below, which relates to an embodiment of the present invention, given by way of non-limiting example and explained with reference to the appended FIG. 1, which is a schematic representation of the steps implemented during the method according to the invention.

FIG. 1 illustrates a method according to the invention implementing an algorithm based on an effort balance being exerted on a power steering system of a vehicle.

The vehicle power steering system comprises a steering wheel connected to a steering column, a rack, an assist motor, a steering computer and two wheels each connected to a link.

The vehicle follows a trajectory which in particular depends on a speed of said vehicle, a rotation speed of the steering wheel and a steering wheel angle. The rotation speed of the steering wheel is also called turning speed.

In the power steering system, the assist motor exerts a force $\vec{F}_{motor}$ on the rack. Similarly, when a driver turns the steering wheel to turn the vehicle wheels, the steering wheel exerts a force $\vec{F}_{steering\ wheel}$ via the steering column on the rack. Furthermore, the rack is connected to the wheels by means of links which exerts a force $\vec{F}_{link}$ thereon. Finally, the friction being exerted on the steering system is separated into a dry friction force $\vec{F}_{dry}$ and a viscous friction force $\vec{F}_{viscous}$.

The dry friction is the friction dependent on the forces applied on the power steering system. It is the minimum friction being exerted on the power steering system. The dry friction will be assimilated to the friction f subsequently.

The viscous friction is dependent on the turning speed of the steering wheel.

Thus, the effort balance is written in a benchmark of the rack:

$$Ma = F_{motor} + F_{steering\ wheel} - F_{link} - f - f_{viscous}$$

With M: the mass of the power steering system and a: the acceleration being exerted on the power steering system, that is to say the acceleration of the steering wheel rotation.

By assuming that the turning speed is substantially uniform, that is to say that the rotation speed of the steering wheel is substantially constant, the value of the acceleration of the steering wheel being exerted on the power steering system is negligible. Thus, in the above equation, a=0.

In addition, by assuming that the vehicle follows a substantially rectilinear trajectory, the steering wheel angle can be considered equal to the straight line angle. Thus, the effort exerted by the links $\vec{F}_{link}$ on the rack is negligible. Thus, in the above equation, $F_{link}=0$.

Furthermore, with the assumption of a low turning speed, the viscous friction force $\vec{F}_{viscous}$ is also negligible. Thus, in the above equation, $f_{viscous}=0$.

Finally, with the above assumptions, the effort balance is written:

$$F_{motor} + F_{steering\ wheel} = f$$

Or also, $RFe = f$

It is deduced that when the turning speed is low and substantially uniform, and that the vehicle follows a substantially rectilinear trajectory, a measurement of the RFe directly provides an estimate of the value of the friction being exerted on the power steering system.

These assumptions are validated when the steering wheel crosses a straight line angle, at a low and constant speed, about the straight line angle.

The crossing of the straight line angle can be a succession of turning.

FIG. 1 represents the method according to the invention based on the algorithm described above implementing a step 1 of acquiring a plurality of vehicle data d, a step 4 of estimating the friction value f, a step 5 of calculating the nominal friction value $f_n$, a step 2 of comparing the data d, a step 3 of estimating a reliability coefficient p of the vehicle data d and the estimated friction value f.

The step 1 of acquiring a plurality of vehicle data d allows making available, to the different steps of the method, the data d required to carry out the calculation of the friction value f of the power steering system. The step 1 of acquiring a plurality of vehicle data d comprises a phase of processing the vehicle data d. The processing phase in particular removes the dynamic components from the received raw data, by applying a low-pass filter. The step 1 of acquiring a plurality of vehicle data d receives raw data and emits data d. The raw data are the vehicle speed, the steering wheel angle, the turning speed, the force exerted by the assist motor on the rack, the steering wheel force exerted on the rack, and a temperature of the steering computer. The data d are the vehicle speed, the steering wheel angle, the turning speed, the force exerted by the assist motor on the rack, the steering wheel force exerted on the rack, the temperature of the steering computer and also the steering wheel acceleration, the RFe, and an angular derivative of the RFe.

The step 2 of comparing the data d allows determining periods during which conditions are validated. The step 2 of comparing the data d receives as input the data d and compares each of the data d with a specific predefined interval. For example, the turning speed should be comprised in an interval of 5 to 20°/s, the steering wheel angle should be comprised in an interval of +/−2°, the temperature of the computer should be comprised between 0° C. and 60° C. and a value of an angular spacing relative to the last turning reversal should be about 5°. When all these data d are comprised in the corresponding interval, the step 2 of comparing the data d emits a validation signal v.

The step 4 of estimating the friction value f calculates the friction value f by averaging the RFe when the comparison step 2 emits the validation signal v. The step 4 of estimating the friction value f receives as input the data d, and the validation signal v and emits the friction value f.

The step 3 of estimating the reliability coefficient p of the vehicle data d and the estimated friction value f assigns a weight to each datum d and to the friction value f depending on a variation of said datum d and said friction value f. The weight is determined depending on predefined maps and charts. The reliability coefficient 2 of the vehicle data d and the estimated friction value f is then calculated from the assigned weights. The step 3 of estimating the reliability coefficient p of the vehicle data d and the estimated friction value f receives as input the data d, the friction value f and emits the reliability coefficient p of the vehicle data d and the estimated friction value f.

The step 5 of calculating the nominal friction value $f_n$ performs an average weighted by the reliability coefficient p of the vehicle data d and filtered by an averaging coefficient w.

The averaging coefficient w is scalable during a period of vehicle operation. This allows changing a compromise between speed and stability of the calculation of the nominal friction value depending on the period of vehicle operation.

The step 5 of calculating the nominal friction value $f_n$ is performed when the validation signal v disappears. The step 5 of calculating the nominal friction value $f_n$ receives as input the validation signal v, the friction value f, the reliability coefficient p of the vehicle data d and the estimated friction value f and emits the nominal friction value $f_n$.

The nominal friction value $f_n$ is determined by learning the method since each new calculated value refers to the previous value $f_{n-1}$. Thus, the nominal friction value $f_n$ is more accurate than the friction value f.

Of course, the invention is not limited to the embodiments described and represented in the appended figures. Changes remain possible, in particular from the point of view of the constitution of the various elements or by substitution of technical equivalents, without departing from the protection field of the invention.

The invention claimed is:

1. A method for estimating a value of friction exerted on a power steering system of a vehicle, the method comprising:
   acquiring a plurality of vehicle data, including one or more values of an effort of an assist motor on a rack, and one or more values of a steering wheel effort on the rack, the acquiring being performed during a turning of the vehicle, resulting in a crossing of a straight line angle, said turning being carried out with a substantially uniform speed comprised in a predefined interval, and a steering wheel angle comprised in a predefined interval;
   estimating a friction value by averaging a sum of the values of the steering wheel effort and the assist motor effort on the rack; and
   calculating a nominal friction value by recurrence depending on the friction value.

2. The method according to claim 1, wherein a speed of the turning is between 5 and 20°/s.

3. The method according to claim 1, wherein the steering wheel angle is comprised between +/−2° relative to an angle for which the vehicle follows a substantially rectilinear trajectory.

4. The method according to claim 1, wherein a value of an angular spacing relative to a last turning reversal is 5°.

5. The method according to claim 1, further comprising, after acquiring a plurality of vehicle data, a comparison step comparing at least one temperature of a computer, to a range of predefined values.

6. The method according to claim 5, wherein the comparison step emits a validation signal when the data are in the range of predefined values and/or emits an invalidation signal when at least one datum is not in the range of predefined values.

7. The method according to claim 6, wherein the estimating of the friction value is performed when the comparison step emits the validation signal and/or when the comparison step does not emit the invalidation signal.

8. The method according to claim 6, further comprising estimating a reliability coefficient of the vehicle data and the estimated friction value.

9. The method according to claim 8, wherein the calculation of the nominal friction value is weighted by at least the reliability coefficient of the vehicle data and the estimated friction value.

10. The method according to claim 8, wherein the nominal friction value is weighted by an averaging coefficient.

11. The method according to claim 6, wherein the calculating of the nominal friction value is performed when the comparison step does not emit the validation signal, and/or when the comparison step of emits the invalidation signal.

12. The method according to claim 1, wherein the acquiring of a plurality of vehicle data comprises a phase of processing the vehicle data.

\* \* \* \* \*